United States Patent [19]

Krogsrud

[11] Patent Number: 4,846,434
[45] Date of Patent: Jul. 11, 1989

[54] COUNTERBALANCED ARM ASSEMBLY

[75] Inventor: Jens C. Krogsrud, Oslo, Norway

[73] Assignee: Jac Jacobsen Industrier A.S., Oslo, Norway

[21] Appl. No.: 228,298

[22] Filed: Aug. 4, 1988

[51] Int. Cl.4 ................................................. E04G 3/00
[52] U.S. Cl. ............................. 248/280.1; 248/281.1; 248/586
[58] Field of Search ............... 248/280.1, 281.1, 123.1, 248/292, 586, 585, 325, 283; 362/402, 427, 413

[56] References Cited

U.S. PATENT DOCUMENTS

| 2,787,434 | 4/1957 | Jacobsen | 248/586 X |
| 3,041,060 | 6/1962 | Jacobsen | 248/284 X |
| 3,226,073 | 12/1965 | Jacobsen | 248/586 |
| 3,543,019 | 11/1970 | Jacobsen | 248/586 X |
| 3,774,873 | 11/1973 | Krogsrud | 248/324 |
| 4,080,530 | 3/1978 | Krogsrud | 362/402 |
| 4,160,536 | 7/1979 | Krogsrud | 248/123.1 X |
| 4,447,031 | 5/1984 | Souder et al. | 248/280.1 |
| 4,494,177 | 1/1985 | Matthews | 362/402 |
| 4,770,384 | 9/1988 | Kuinazima et al. | 362/413 X |

*Primary Examiner*—J. Franklin Foss
*Attorney, Agent, or Firm*—Pasquale A. Razzano

[57] ABSTRACT

A spring counterbalanced arm assembly including a base member, a lower arm, an upper arm, a knee bearing member and object supporting means. The lower arm has an elongated, generally tubular member defining an elongated cavity therein. The base end of the tubular member includes means defining a forwardly extending bracket and has pivot means thereon positioned forwardly of an exterior front wall of the tubular member for pivotally connecting the base end bracket of the lower arm to the base member at a first pivot axis of the base member. The knee end of the tubular member includes a forwardly extending bracket having pivot means thereon positioned forwardly of the exterior front wall for pivotally connecting the knee end of the lower arm to a knee end of an upper arm and to the knee bearing member at a first pivot axis of the knee bearing member. The lower arm includes a slider and tension spring enclosed within it to provide counterbalancing force. The lower arm assembly also includes an elongated stay arm substantially completely enclosed within the elongated cavity of the lower arm. The stay arm is pivotally connected to the knee bearing member and to the base member so as to form a parallelogram mechanism. The counterbalanced arm assembly also includes an upper arm assembly having a generally tubular member defining an elongated cavity therein, and an extensible tension spring and slider for providing counterbalancing force by means of linkage means between the knee bearing member and the slider.

4 Claims, 7 Drawing Sheets

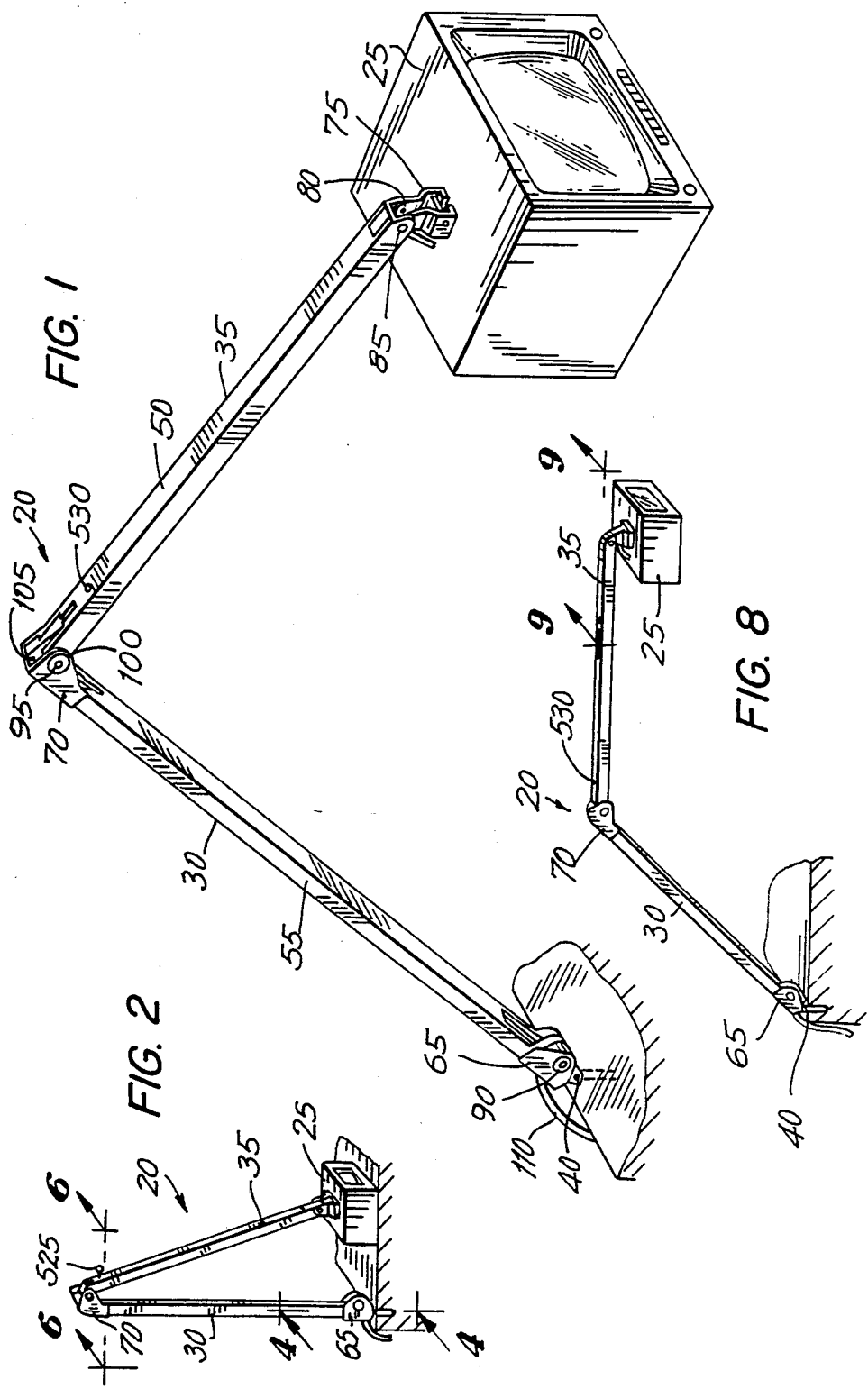

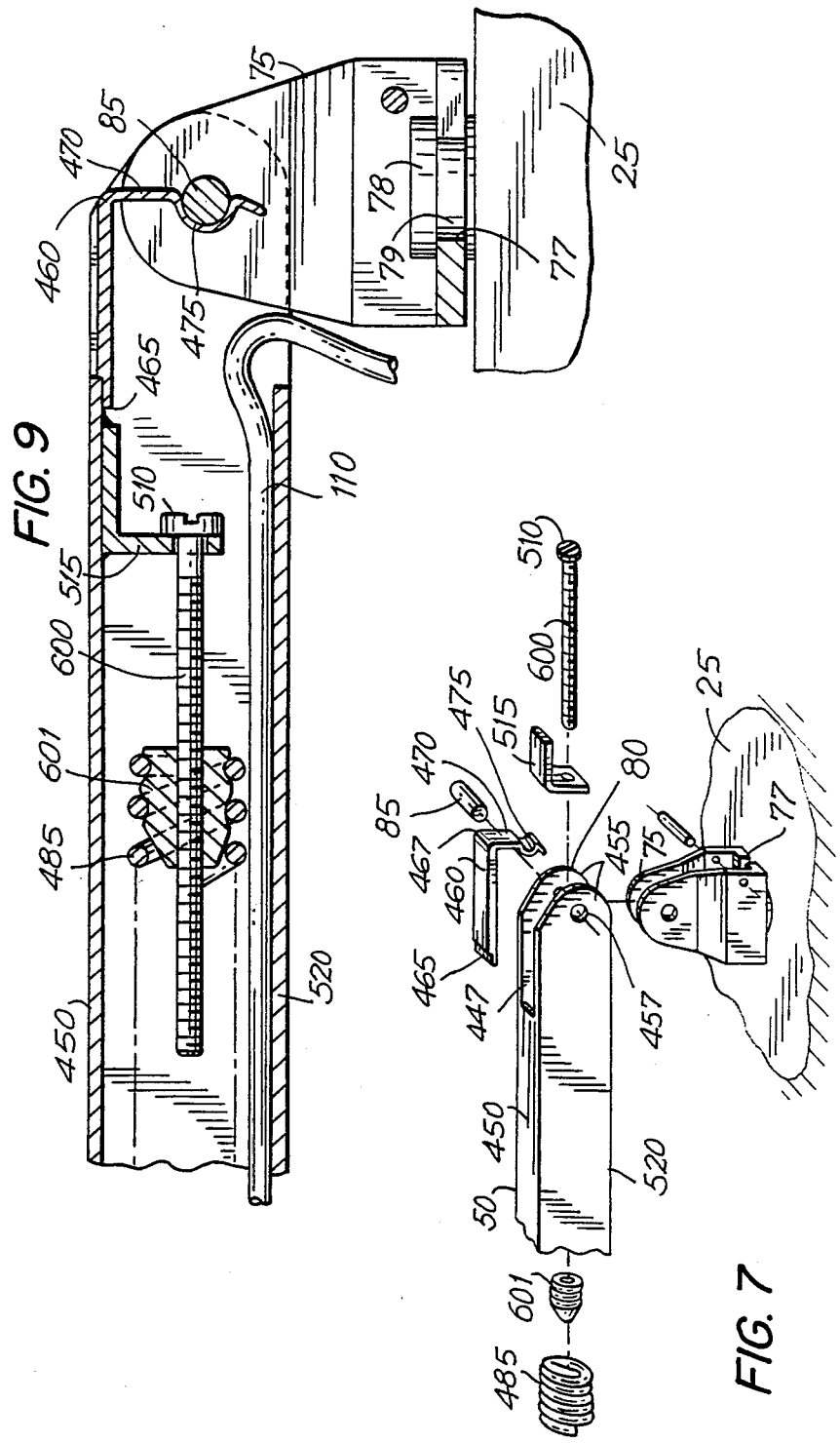

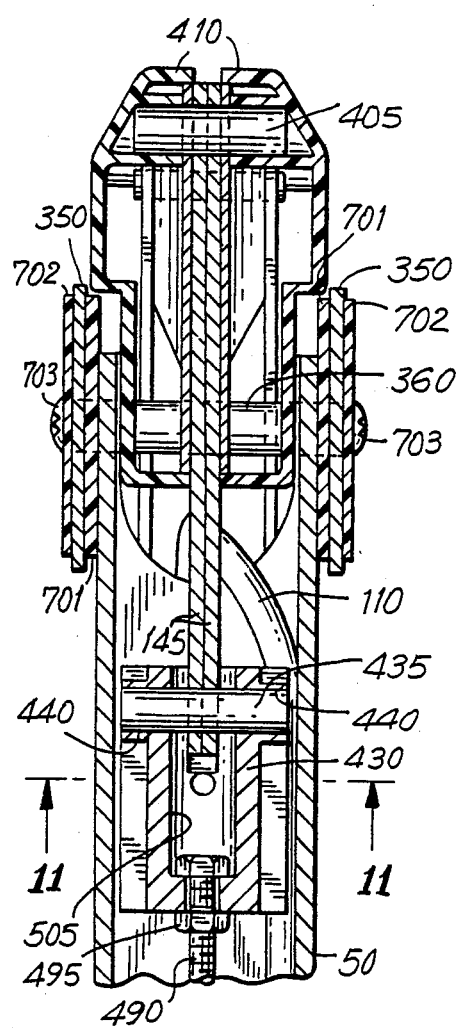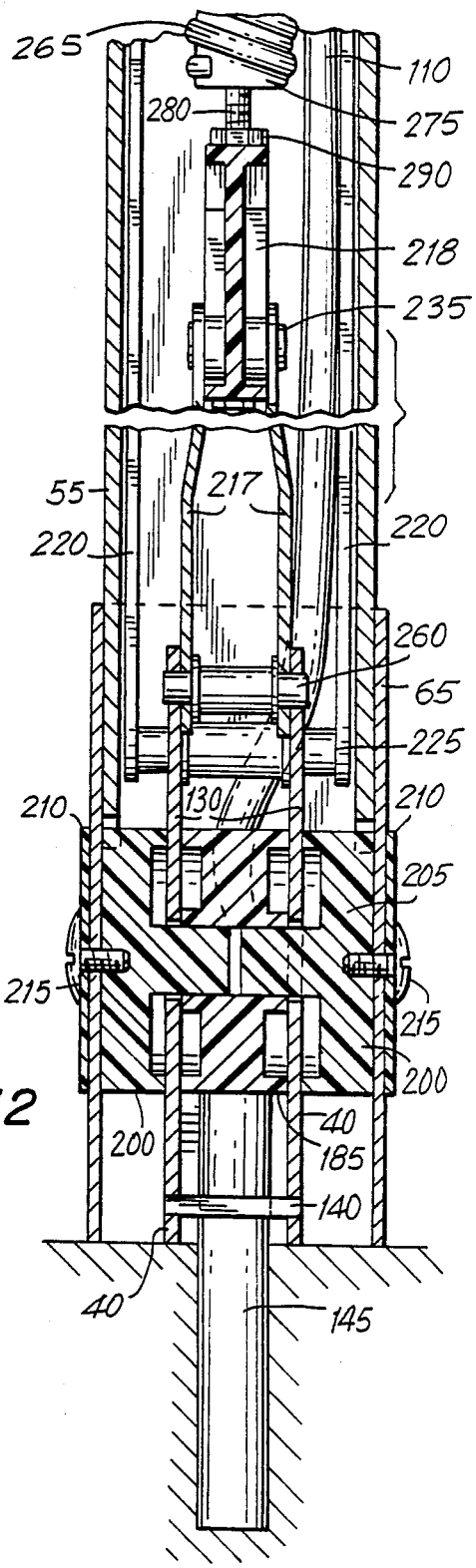

ive support arm mechanism which is sturdy in
construction, dependable and safe in use, and which will
perform satisfactorily over long periods of use.

It is a still further object of the invention to provide a
counterbalanced arm assembly having an enclosed
counterbalancing mechanism which has a sturdy and
simple spring adjusting mechanism which may be
readily adjusted for varying weights of objects to be
supported within a relatively wide range, and without
excessive trial and error.

It is a yet further object of the invention to provide a
counterbalanced arm assembly which is sturdy, yet
inexpensive to manufacture.

SUMMARY OF THE INVENTION

In accordance with an aspect of the present invention, a spring counterbalanced arm assembly articulable throughout a wide range of positions is provided which includes a base member having first, second and third pivot axes thereon, at least said the first and second pivot axes of which are parallel but non-coaxial. The arm assembly further includes a knee bearing member which has at least first, second and third pivot axes thereon, all these axes being parallel but non-coaxial. The counterbalanced arm assembly includes a lower arm having an elongated generally tubular member defining an elongated cavity therein and having an exterior front wall, a base end and a knee end. The base end includes means defining a forwardly extending bracket and has pivot means thereon positioned forwardly of the exterior front wall for pivotally connecting the base end bracket of the lower arm to the base member at the first pivot axis of the base member. The knee end includes means defining a forwardly extending bracket having pivot means thereon positioned forwardly of the exterior front wall for pivotally connecting the knee end of the lower arm to a knee end of an upper arm and to the knee bearing member at the first pivot axis of the knee bearing member. The lower arm includes a slider which is longitudinally slidably enclosed within the elongated cavity of the lower arm and also includes an extensible tension spring substantially completely enclosed within the elongated cavity of the lower arm. The lower arm assembly also includes an elongated stay arm in the elongated cavity of the lower arm and substantially completely enclosed therein, said stay arm having a base end pivotally connected to the base member at the second axis of the base member and a bearing end pivotally connected to the knee bearing member at the second axis of the knee bearing member. Means for attaching an end of the lower arm extensible tension spring to an interior wall of the lower arm and means for attaching another end of the extensible tension spring to the lower arm slider are provided. The lower arm assembly also includes linkage means for linking the lower arm slider to the base member, these linkage means being relatively short with respect to the lower arm and having a base end pivotally connected to the base member at the third pivot axis of the base member and a slider end pivotally connected to the lower arm slider. The counterbalanced arm assembly also includes an upper arm assembly having a generally tubular member defining an elongated cavity therein, means defining a free end and means defining a knee end, the free end including means for supporting an object and the knee end including means for pivotally connecting the knee end of the upper to the knee end of the lower arm and to the knee bearing member about the first pivot axis of the knee bearing member. The upper arm assembly includes an upper arm slider longitudinally slidably enclosed within the elongated cavity of the upper arm, and an upper arm extensible tension spring in the elongated cavity of the upper arm and substantially completely enclosed therein. Means for attaching an end of the upper arm extensible tension spring to an interior wall of the upper arm and means for attaching another end of the upper arm extensible tension spring to the upper arm slider, are also provided. The upper arm also includes linkage means for pivotally linking the upper arm slider to the knee bearing member, the upper arm linkage means being relatively short with respect to the upper arm and having a slider end pivotally linked to the upper arm slider and a bearing end pivotally linked to the knee bearing member at the third axis of the knee bearing member.

BRIEF DESCRIPTION OF THE DRAWINGS

The above, other objects, features and advantages of the invention will be apparent in the following detailed description of an illustrative embodiment thereof, which is to be read in connection with the accompanying drawings, wherein:

FIG. 1 is a perspective view of a counterbalanced arm in accordance with one aspect of the present invention, depicted in a partially extended condition and supporting an object;

FIG. 2 is a perspective view of the counterbalanced arm assembly of FIG. 1, shown in a less extended condition;

FIG. 7 is an exploded view of the free end of the upper arm;

FIG. 8 is a perspective view of a counterbalanced arm assembly of FIG. 1, shown in an extended position with the upper arm substantially horizontal;

FIG. 9 is a side sectional view of the counterbalanced arm assembly of FIG. 8, taken along the line 9—9 of FIG. 8;

FIG. 10 is a sectional view taken through the knee end of the upper arm which connects to the knee end of the lower arm along the line 10—10 of FIG. 6;

FIG. 11 is an endwise sectional view taken along the line 11—11 of FIG. 10;

FIG. 12 is a sectional view of the base end portion of the lower arm and the base member of the counterbalanced arm assembly depicted in FIG. 4, taken along the line 12—12 of FIG. 4.

DETAILED DESCRIPTION OF THE DRAWINGS

Figure 3:
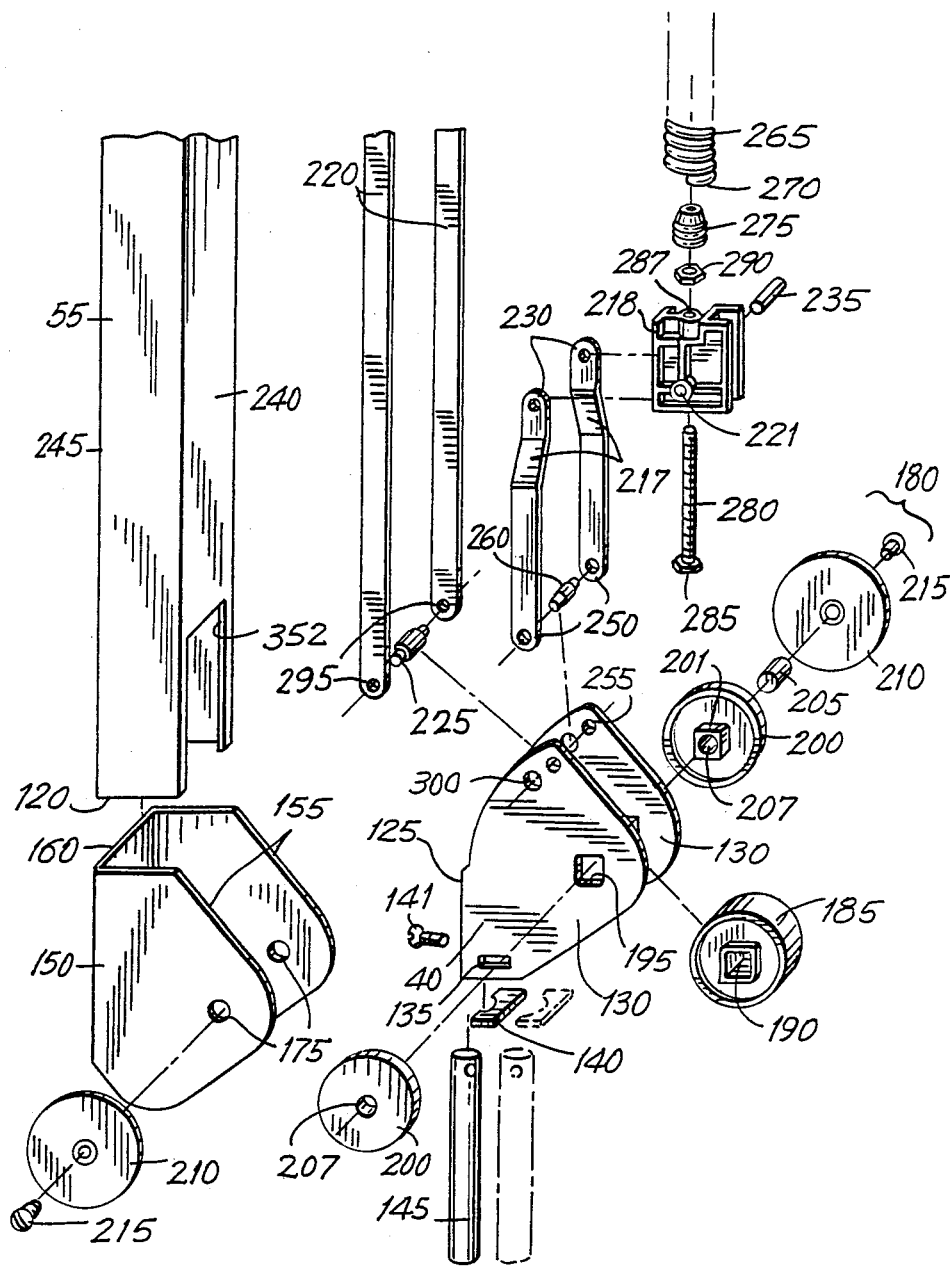
FIG. 3 is an exploded view of the base end portion of the lower arm and the base member.

Referring now to the drawings in detail, and initially to FIGS. 1, 2 and 8 thereof, a counterbalanced arm assembly 20 accordance with a preferred embodiment of the present invention is depicted for supporting an object 25, which in this case is a television. The arm assembly includes a lower arm 30, an upper arm 35, and a base member 40 which may be affixed to a mounting position on a desk, table, wall etc. by means of a suitable mounting bracket of conventional design. The upper arm 35 has an elongated tubular member 50 having a substantially square cross-section. The lower arm 30 has an elongated tubular member 55 having a substantially square cross-section, a base end bracket 65 and a knee end bracket 70. The tubular members 50 and 55 may alternatively employ other cross-sectional shapes. The base end bracket 65 of the lower arm 30 is pivotally connected to the base member 40 at pivot axis 90 and is rotatable about this pivot axis through a wide range of movement. The knee end bracket 70 of the lower arm 30 is pivotally attached at pivot axis 95 to the knee end 100 of upper arm 35 and to a knee bearing member 105 so that upper arm 35 is rotatable about pivot axis 95 relative to lower arm 30 throughout a wide range of movement. Upper arm 35 supports object supporting bracket 75 at its forward or object supporting end 80 by means of screw 85. All parts of the counterbalanced arm assembly should be made of a material having suitable strength characteristics, such as steel, except as otherwise indicated herein. An electric cord 110 extends from the base member 40, through the tubular members 50 and 55 and to television 25, for supplying electrical power and signals to television 25.

Figure 4:
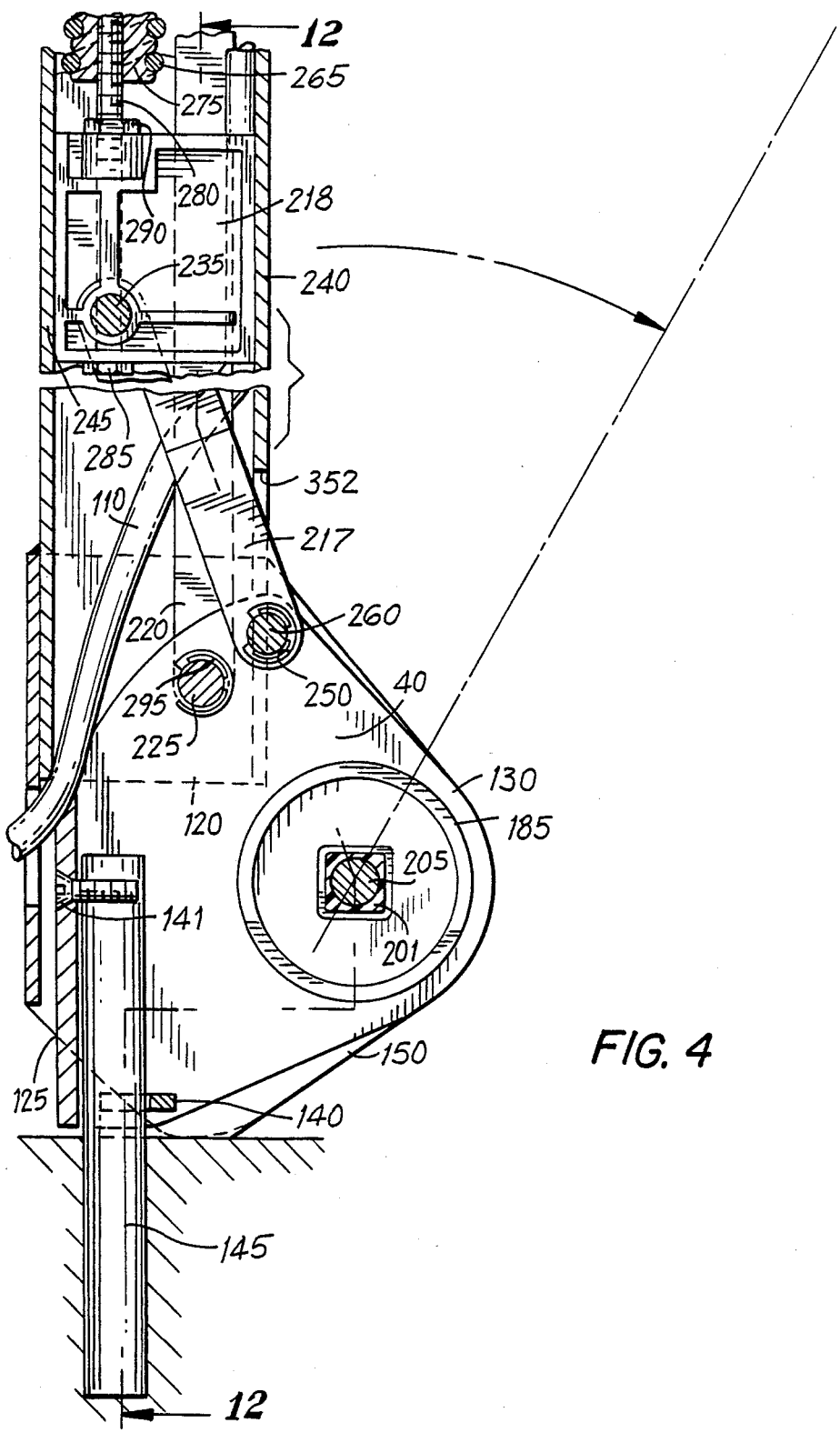
FIG. 4 is a side sectional view of the base end portion of the lower arm and the base member in an assembled condition taken along the line 4—4 of FIG. 2.

Referring now to FIGS. 3, 4 and 12, the construction of the base member 40 and the base end 120 of lower arm 30 will be described. Base member 40 is generally U-shaped, and is opened in a forward direction, forward being defined as generally extending from the base member toward the object supporting end 80 of the upper arm 35. Base member 40 has two parallel, generally triangle shaped flanges 130 extending forwardly from a rear wall 125, and spaced apart from each other to allow angular rotation of the base end of lower arm 30.

Base member 40 is slotted in its lower rear quadrant with slot 135, which receives supporting plate 140. Base bolt 145 is inserted upwardly into the open portion of the "U" of the base member, and retained by means of supporting plate 140 and screw 141 located near the top of back wall 125. Base bolt 145, is, in turn supported in a conventional mounting bracket 45 mounted in a conventional manner to the supporting surface.

A U-shaped bracket 150 open in the forward direction is attached, by convenient means such as welding, to base end 120 of tubular member 55 with its inside walls to the exterior of tubular member 55, its rear wall 160 abutting the exterior of rear wall 245 of tubular member 55. The lower end of front wall 240 of tubular member 55 includes a square notch 352 to allow free angular movement with respect to the base member 40. The bracket 150 has two forwardly extending parallel, generally triangular shaped flanges 155, which flanges extend forward beyond a tangent line drawn along the exterior of front wall 240 of tubular member 55. Axle holes 175 are positioned on flanges 155 near their forward apices for pivotally connecting bracket 150 about base member 40 by means of a base pivot axis assembly 180, with the flanges 155 surrounding the flanges 130 of base member 40.

Pivot axis assembly 180 includes a spacer bushing 185 having a square opening 190 therethrough of substantially the same size as square holes 195 in flanges 130 of base member 40. A pair of spacer bushings 200 formed of a low friction material such as Nylon and having square projections 201 on their interior faces to mate with holes 195 and opening 190 are interposed between flanges 130 and flanges 155, thus preventing relative rotation of bushings 185 and 200 with respect to flanges 130 of base member 40. An axle pin 205 is inserted through bores 207 in spacer bushings 200 and through holes 175 of flanges 155, coaxially with the square holes 195 of flanges 130. Pivot assembly 180 is held together at each end by cover washers 210 and end screws 215. In this manner, the base end bracket 150 is pivotally connected to base member 40, coaxially with holes 195 of base member 40.

A generally square slider block 218, preferably formed of a low friction material such as Nylon, is pivotally connected to a pair of doglegged links 217 through its axle hole 221 and axle holes 230 by means of axle pin 235 and is longitudinally slidably fitted within the cavity formed by the tubular member 55. Links 217 are substantially shorter than the length of tubular member 55 to provide the desired geometry. The slider block fits closely between the interior faces of front wall 240 and rear wall 245 of the elongated tubular member 55 so that it will be constrained to slide longitudinally, but includes clearance on either side between the interior side walls of the tubular member to avoid restricting movement of elongated stay arms 220. The lower end of links 217 include axles holes 250, by which the links are pivotally connected to base member 40 by means of pivot axle 260 through pivot holes 255 of base member. Pivot axle 260 is parallel to but non-coaxial with the pivot axle 205 of pivot axis assembly 180, so that angular movement of tubular member 55 with respect to base member 40 will cause slider 218 to move longitudinally in the interior of the tubular member in the similar manner to a piston in a cylinder. An extensible tension spring 265 is enclosed within the tubular member 55, the lower end 270 of which is connected to spring nut 275 inserted into the end 270 of the spring, and a bolt 280 having a hexagonal head 285 is longitudinally inserted through a hole 287 of slider block 218 and locked in place with locknut 290.

Figure 5:
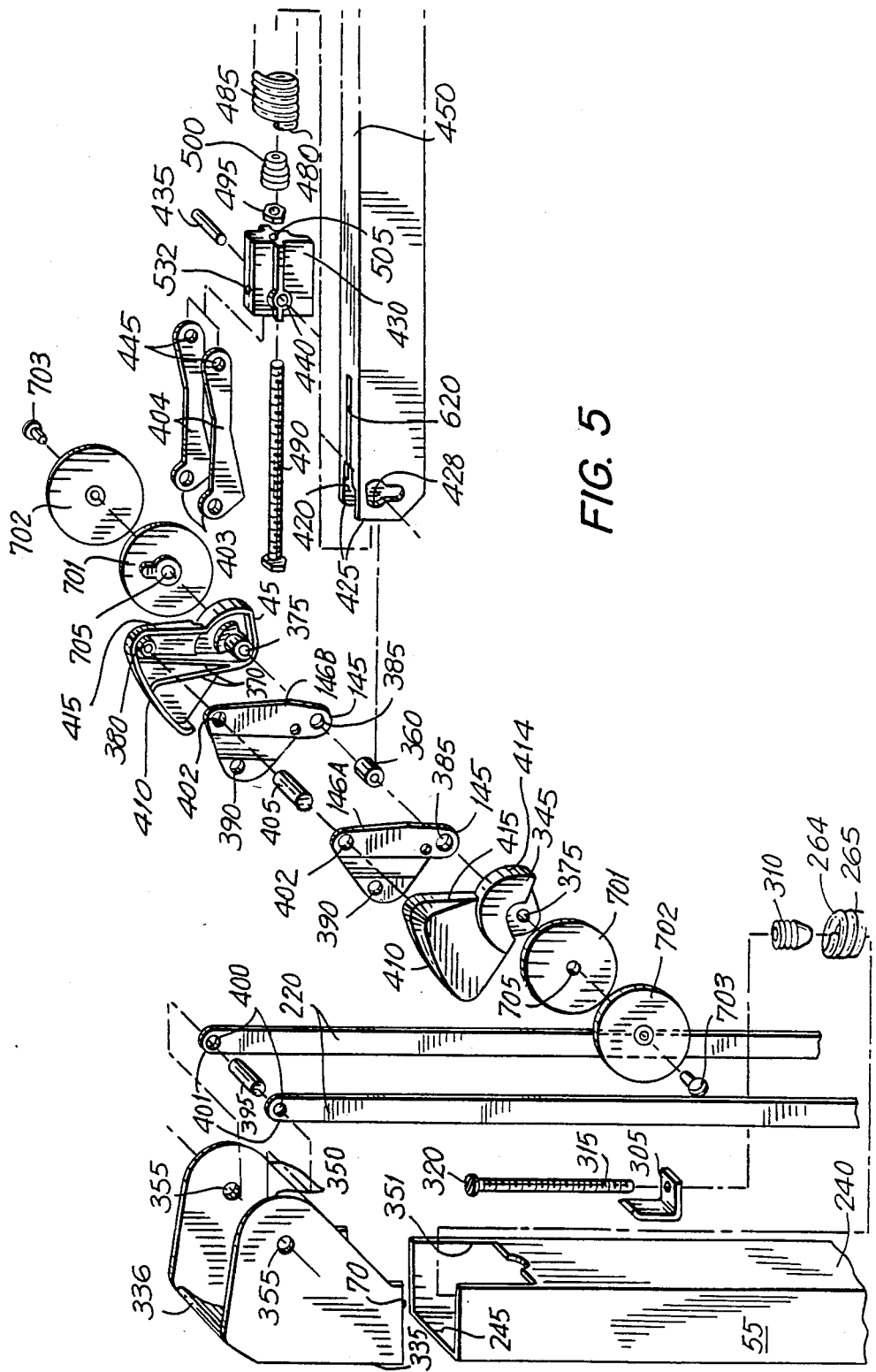
FIG. 5 is an exploded view of the knee end portion of the counterbalanced arm assembly.
Figure 6:
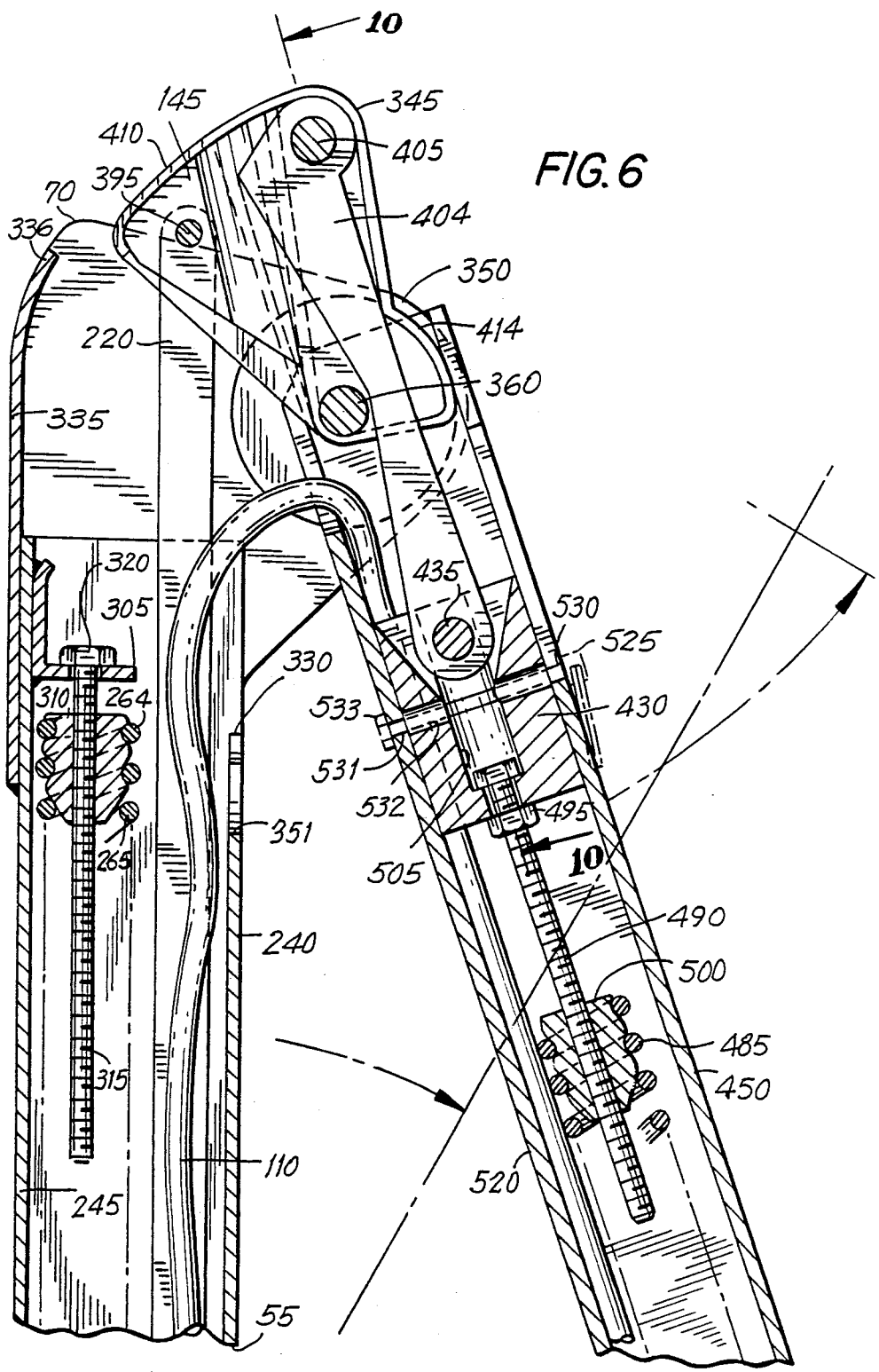
FIG. 6 is a side sectional view of the knee portion of the counterbalanced arm assembly of FIG. 2 in an assembled condition, taken along the line 6—6 of FIG. 2.

As shown in FIGS. 5 and 6, the upper end 264 of the spring 265 is connected to a spring nut 310, and bolt 315 having a screwdriver slotted head 320 is longitudinally threaded into the spring nut. The head end 320 of the bolt 315 is supported by L-shaped mounting bracket 305 which is, in turn, attached to the interior of rear wall 245 by convenient means such as welding. Slotted head 320 is accessible through the upper end of the lower arm 30 without dissassembly of the counterbalanced arm assembly so that the tension on spring 265 can be adjusted.

Referring now to FIGS. 5, 6, 10 and 11, knee end bracket 70 is attached to the knee end of the tubular member 55 by convenient means such as welding in a similar manner to the base end bracket 65. Rear wall 335 of knee bracket 70 is inwardly curved somewhat at its upper portion 336. The knee bracket includes a pair of extended flanges 350, each of which have an axle hole 355 sized to receive knee pivot axle 360, which pivotally connects to flanges 425 of the tubular member 50, which are essentially extensions of the side walls of tubular member 50, through slotted knee pivot holes 428 in flanges 425, by means of knee pivot axle 360. The front wall 240 of tubular member 55 includes a generally square notch 351 at its upper or knee end to allow a sufficient degree of clearance for angular rotation of the knee bearing member 145 and associated knee bearing cover 345, and the upper wall 450 of tubular member 50 includes a cutout region 420 at its knee end to permit free relative motion of member 50.

The axes of pivot axle holes 355 of the knee bracket flanges 350 are positioned forward of a tangent line drawn through the exterior face of front wall 240 of tubular member 55, approximately the same distance forward of the front wall as is axis of the pivot assembly 180 of the base bracket 150, so that a line drawn between these pivot axes will be forward of the front wall of the tubular member 55 and substantially parallel with it. Offsetting the knee pivot axis holes 355 from the front fall of tubular member 55 in this manner provides clearance to allow angular movement of the upper arm with respect to the lower arm, and also increases the lever arm available for providing counterbalancing force to the lower arm, without the need to increase the front wall to rear wall dimension of the tubular member 55.

A knee bearing member 145, comprising a pair of mirror-image plates 146 in tandem, is interposed between flanges 425 of the upper tubular member 50. Knee bearing member 145 has an approximate triangle shape, and a slightly convex curved front edge 365.

The apices of the bearing member 145 are convexly curved for facilitating the motion of the knee bearing member. The knee bearing member has a knee axle hole 385 for pivotally connecting the knee bearing member to knee end of the lower arm and the upper arm by means of kneeaxle 360.

A counterbalancing mechanism consisting of stay arms 220, which are elongated, preferably steel bars, is provided to maintain a parallelogram geometry so that knee bearing member 145 remains in a constant angular position in space regardless of lower arm movements. Stay arms 220 are enclosed substantially completely within tubular member 55 and are pivotally connected at their lower ends 295 at pivot axis holes 300 of base member 40 by means of pivot axle 225, which is parallel to but non-coaxial with the pivot axis of pivot axis assembly 180. Stay arms 220 are pivotally connected to the knee bearing member at stay arm axle hole 400, which receives stay arm pivot axle 395, which also passes through axle holes 390 of knee bearing member 145. As so constructed, the radial distance between the stay arm axle 395 of the knee bearing and the knee pivot 360 is substantially the same as the radial distance between base member pivot axis assembly 180 and the stay arm pivot axle 225, and the length of the stay arm between axles 225 and 395 is substantially the same as the distance between the knee pivot axle 360 and the axis of base bracket pivot assembly 180, so that stay arms 22 are always generally parallel to elongated member 55, and lines drawn between pivot axes 180, 225, 395 and 360 form a parallelogram.

The knee bearing member further has an upper arm link axle hole 402 for pivotally connecting the knee bearing member to the the knee end 403 holes of upper arm links 404 by means of link axle 405. The opposite end of upper arm link 404 is pivotally connected to a slider block 430 by means of slider pivot axle 435 through slider axle hole 440 and axle holes 445 of the links 404. The upper wall 450 of tubular member 50 has a longitudinal slot 620 extending forwardly from cutout region 420, which is sized to permit the links 404 to move freely throughout their range of motion.

Slider block 430 is generally square in shape and is preferrably made of a sturdy low friction material such as Nylon. The top-to-bottom dimension of slider block is sized just slightly smaller than the interior distance between the upper wall 450 and lower wall 520 of tubular member 50 so that it is confined to travel in a longitudinal direction inside the tubular member. Slider block 430 is connected to the end 480 of an extensible tension spring 485 nearest the knee end of tubular member 50 by means of a mounting bolt 490, lock nut 495 and spring nut 500, the mounting bolt 490 passing through a longitudinal hole 505 in the slider block 430. The extensible tension spring 485 is substantially completely enclosed within the hollow tubular member 50 of the upper arm 35.

As shown in FIGS. 7 and 9, the opposite end of spring 485 is mounted by means of a spring nut 601, an adjusting screw 600 having a head 510, which is slotted for receiving a screwdriver, the screw 600 being supported by a generally L-shaped bracket 515 attached to the inside of wall 450 of the tubular member 50 in a convenient manner such as by welding or brazing.

To give knee bearing member 145 additional stiffness in the side-to-side direction, bearing plate covers 345 are provided on either side of the knee bearing member. These bearing plate covers are preferably molded of a sturdy plastic material such as Nylon, and have internal stiffening ribs 370 to provide the side-to-side stiffness. The bearing plate covers also include a knee axle hole 375 and an upper arm link axle hole 380 corresponding to the axle holes 385 of the knee bearing member, and respectively co-axial therewith. Bearing plate covers 345 also include a rearwardly curved upper surface 410 of a slightly larger radius than the radius of the upper edge of the knee bearing member so that when the bearing plate covers are assembled in their proper position, the upper curved surface of each bearing plate cover will mate with the other, thereby concealing the knee bearing 145. The bearing plate cover includes a front wall 415, which is somewhat recessed to permit free movement of the upper arm links 404 when the covers are assembled together. The bearing plate covers also include a front convexly curved portion 414 curved about an axis extending through the knee axle hole 375 and adapted to closely fit within cutout region 420 of the upper wall 450 of the tubular member 50 of the upper arm, thus allowing free relative rotation between the knee bearing member and the upper arm throughout a range of angular movement. Bushings 701 made of a sturdy low friction material such as Nylon are interposed between flanges 425 of the upper arm and 350 of the lower arm knee bracket. Bushings 701 include projections 705 on their interior faces which mate with the shape of slotted axle hole 428 to prevent relative rotation of the bushings with respect to the flanges 425. Cover washers 702 are provided on the exterior faces of flanges 350 of the knee bracket 70. The entire knee assembly is held in place by screws 703, which threadably engage pivot axle 360 on each of its ends. Thus, pivot axle 360, screws 703, cover washers 702 and knee bracket 70 move together.

The link pivot axle 405 of knee bearing member 145 to which the linkage 404 is connected extends beyond a tangent line extending through the exterior face of upper wall 450 of tubular member 50 of upper arm 35 during a large range of the movement of the relative positions of the arms, particularly when the upper arm is in a near horizontal position. Thus, a larger lever arm (i.e. more torque), created by the radial distance between pivot axle 405 and knee axle 360, is available for transmission of counterbalancing forces through linkage 404 than would otherwise be possible if the pivot axle 405 was required to be inside of this tangent line. In this way, heavier objects can be supported with the same size spring arm as were previously used for lighter objects, thereby leading to a lighter and less expensive counterbalanced arm assembly.

The free end 80 of the tubular member 50 of upper arm 35 includes parallel flanges 455 extending endwise, which are in essence extensions of the side walls of the tubular member. Flanges 455 include holes 457 through which screw 85 passes to support a substantially U-shaped bracket 75 of generally conventional design. Bracket 75 has a slot 77 in for receiving a mating shaft 79 with a mushroomed head 78. The shaft 79 is, in turn, attached to the object to the supported in a conventional manner.

The free end 80 of the tubular member 50 of upper arm 35 has a slot 447 in its upper wall 450, between the two end flanges 455. A removable L-shaped cover plate 460 may optionally be provided to selectively cover slot 447. Cover 460 is used to conceal and to facilitate attachment and detachment of electrical cable connectors on cord 110. Cover 460 has a notched rear end 465 which mates with the end of the upper wall at the upper slot, a downward bend 467, and a front end 470 beyond the bend having an inwardly curved portion 475 adapted to springably mate with support screw 85. Cover 460 can thus be put in place and held by its on spring tension.

A removable pin 525 is provided extending through holes 530 and 531 in the upper and lower walls of tubular member 50 and through a transverse hole 532 in slider block 430, secured by a nut 533. When 525 pin is in place (i.e. during installation), slider block 430 is immobilized with the upper arm bent back toward the lower arm to almost the full extent of its travel, as shown in FIG. 2. With the slider block 430 immobilized in this position, the arm assembly is more compact and more easily packed for shipment. Furthermore, when the arm assembly is bent into this position, attachment of the object to the object supporting bracket 75 is simplified, because the object supporting bracket will be low, at a convenient working height. Furthermore, pin 525 restrains the considerable spring tension on the upper arm during installation, for increased safety. Indeed, with the pin 525 in place, even the knee portion of the arm assembly can be disassembled without danger. Because of the considerable spring force exerted on the pin 525, pin 525 cannot be removed without excessive force until the spring force is substantially balanced, that is, until the object being installed on the supporting bracket 75. When the object is properly installed, pin 525 is removed to allow normal movement of slider block 430, and hence the upper arm relative to the lower arm. Thus, pin 525 is not used during normal operation of the arm assembly 20. When the object is to be removed from the supporting bracket 75, pin 525 is first reinserted to contain the spring tension, then the object is removed, preventing the built-up spring tension from causing the arm assembly to spring open, which could potentially cause serious injury. Thus, it can be seen that immobilizing pin 525 provides a construction allowing a far more convenient and safe means for installation and removal of the object to be supported.

Although an illustrative embodiment of the present invention has been described herein, it is to be understood that various changes and modifications thereof can be effective without departing from the scope of spirit of the invention.

What is claimed is:

1. A counterbalanced arm assembly articulable for assuming a range of positions comprising a base member having first, second and third pivot axes thereon, at least said first and second pivot axes being parallel but non-coaxial, a knee bearing member including at least first, second and third pivot axes thereon, all said axes being parallel but non-coaxial, a lower arm, said lower arm including an elongated generally tubular member defining an elongated cavity therein and having an exterior front wall, a base end and a knee end, said base end including means defining a forwardly extending base end bracket attached to said tubular member, said base end bracket having pivot means thereon positioned forwardly of said exterior front wall for pivotally connecting the base end bracket of said lower arm to said base member at said first pivot axis of said base member, said knee end including means defining a forwardly extending knee end bracket attached to said tubular member, said knee end bracket having pivot means thereon positioned forwardly of said exterior front wall for pivotally connecting the knee end of said lower arm to a knee end of an upper arm and to said knee bearing member at said first pivot axis of said knee bearing member, a lower arm slider longitudinally slidably enclosed within the elongated cavity of said tubular member, a lower arm extensible tension spring in the elongated cavity of said lower arm and substantially completely enclosed therein, a stay arm in the elongated cavity of said lower arm and substantially completely enclosed therein, said stay arm having a base end pivotally connected to said base member at said second axis of said base member and a bearing end pivotally connected to said knee bearing member at said second axis of said knee bearing member, means for attaching an end of said lower arm extensible tension spring to an interior wall of said lower arm and means for attaching another end of said lower arm extensible tension spring to said lower arm slider, at least one of said attachment means being adjustable when an object is supported without disassembly of the counterbalanced arm assembly, lower arm linkage means for linking said lower arm slider to said base member, said lower arm linkage means being relatively short with respect to said lower arm and having a base end pivotally connected to said base member at said third pivot axis of said base member and a slider end pivotally connected to said lower arm slider, an upper arm assembly including a generally tubular tubular member defining an elongated cavity therein, means defining a free end and means defining a knee end, said free end including means for supporting an object and said knee end including means for pivotally connecting said knee end to the knee end of the lower arm and to the knee bearing member about the first pivot axis of said knee bearing member, an upper arm slider longitudinally slidably enclosed within the elongated cavity of said upper arm an upper arm extensible tension spring in the elongated cavity of said upper arm and substantially completely enclosed therein, means for attaching an end of said upper arm extensible tension spring to an interior wall of said upper arm and means for attaching another end of said upper arm extensible tension spring to said upper arm slider, at least one of said attachment means being adjustable without disassembly of the counterbalanced arm assembly, and upper arm linkage means for pivotally linking said upper arm slider to said knee bearing member, said upper arm linkage means being relatively short with respect to said upper arm and having a slider end pivotally linked to said upper arm slider and a bearing end pivotally linked to said knee bearing member at said third axis of said knee bearing member.

2. The counterbalanced arm assembly as defined in claim 1, wherein at least one of said spring attachment means being adjustable without disassembly of the counterbalanced arm assembly.

3. The counterbalanced arm assembly as defined in claim 1, wherein said knee bearing member has a curved portion curved with respect to the first axis of said knee bearing member, said curved portion extending around both said second and third pivot axes of said knee bearing member to cover the knee bearing member.

4. The counterbalanced arm assembly as defined in claim 1, further including means for selectably immobilizing said upper arm slider, said immobilizing means being operable from the outside of said counterbalanced arm assembly without disassembly of said counterbalanced arm assembly and when the spring tension is substantially balanced by the weight of the object being supported.

* * * * *